United States Patent Office 3,794,634
Patented Feb. 26, 1974

3,794,634
ALIPHATIC LIQUID-PEPTIZABLE CHLORINATED
BUTADIENE POLYMER BLENDS
Robert William Keown, Wilmington, and Jack Leland
Nyce, Newark, Del., assignors to E. I. du Pont de
Nemours and Company, Wilmington, Del.
No Drawing. Filed Mar. 16, 1972, Ser. No. 235,440
Int. Cl. C08f 45/28, 45/34
U.S. Cl. 260—33.6 A                    3 Claims

ABSTRACT OF THE DISCLOSURE

The invention provides a blend of chlorinated butadiene polymers which is readily peptizable in aliphatic liquids to form sprayable dispersions useful as adhesives. The blend comprises (a) a graft copolymer of (1) a chlorinated butadiene selected from chloroprene and 2,3-dichlorobutadiene-1,3, (2) an alkyl acrylate or methacrylate, as the graft portion, and (3) up to 2% by weight of sulfur and (b) a copolymer of sulfur and a chlorinated butadiene selected from chloroprene and 2,3-dichlorobutadiene-1,3. The proportion by weight of alkyl acrylate or methacrylate is 40 to 80% in (a) and 15 to 60% in the total composition; and the proportion of sulfur in (b) is 0.2 to 2%. The number average molecular weight between sulfur atoms in (b) is not over 110,000, and the alkyl group of the alkyl acrylate or methacrylate in (a) contains 1 to 18 carbon atoms.

A preferred method for making the sprayable dispersions from the blends comprises mixing the blend with an organic liquid which is a non-solvent for component (b) but is a solvent for the alkyl acrylate or methacrylate graft of component (a), mixing with the resulting product a thiophilic peptizing agent, and stirring until the desired dispersion is obtained.

BACKGROUND OF THE INVENTION

Stabilizer block or graft copolymers have already been used to aid in preparing dispersions of polymers in organic liquids in which they are insoluble. British Pat. 1,143,404 and U.S. Pats. 3,405,087 to Fryd, and 3,095,-388 to Osmond et al. pertain to such technology. In these prior art processes the polymer to be dispersed is polymerized in an organic liquid containing the polymeric dispersing agent (see U.S. 3,095,388, col. 2, lines 1–12), or at least the backbone portion of the polymeric dispersing agent (see U.S. 3,095,388, col. 2, lines 14–21). In the latter case, the dispersed polymer and the graft polymer are formed at the same time.

The present invention, on the other hand, is concerned with a situation in which both the stabilizing graft polymer and the polymer to be dispersed (the latter being insoluble in the organic medium) are already polymerized and are present as a blend.

When preparing compositions of the prior art by solution polymerization of the monomer components in a common solvent, such toxic liquids as benzene and toluene are frequently used. These toxic liquids present an industrial hazard and there has been a need for a polymer composition, prepared without use of highly toxic solvents, which will be readily peptizable in relatively non-toxic solvents such as hexane or heptane to make sprayable dispersions useful as adhesives.

SUMMARY

Now according to the present invention it has been found that the needs of the prior art for a chlorinated butadiene polymer mixture readily dispersible in aliphatic liquids to form sprayable dispersions useful as adhesives are satisfied by blends of (a) a graft copolymer of chloroprene or 2,3-dichlorobutadiene-1,3 with an alkyl acrylate or methacrylate and, optionally, sulfur and (b) chloroprene or 2,3-dichlorobutadiene-1,3 polymerized with sulfur, provided the proportions of sulfur in the non-grafted polymer are narrowly limited, the maximum number average molecular weight between sulfur atoms in said non-grafted polymer is limited, and the proportions of graft portion in the (a) polymer and in the total composition are within fixed limits.

The present invention is also concerned with processes whereby the polymer blends are produced by mixing latexes of the (a) and (b) portions of the blends, in suitable proportions and separating the polymer blends from the dispersion medium. In a still further aspect the invention is directed to sprayable adhesives comprising dispersions of the polymer blends dispersed in aliphatic liquids.

DESCRIPTION OF PREFERRED EMBODIMENTS

It will be recognized that components (a) and (b) of the novel polymer blends are already known per se; however there has been no suggestion that advantage could be achieved by using them in combination for any purpose.

The graft copolymer

Preparation of the graft copolymer component, hereinafter sometimes referred to as the "stabilizer" copolymer, is well described in U.S. patent application Ser. No. 90,112 filed Nov. 16, 1970 by Donald M. Simons, and the specific examples hereinbelow follow such procedures for preparing the graft copolymer. In these procedures, lower alkyl or cycloalkyl esters of unbranched $\alpha$-$C_1$-$C_4$ alkyl acrylates are copolymerized in emulsion with 2-chloro-1,3-butadienes (e.g. chloroprene or 2,3-dichloro-1,3-butadienes) until all of the latter monomer is exhausted, and the remaining alkylacrylate is then grafted onto the copolymer backbone so-formed. The reaction proceeds in two distinct steps, the grafting step requiring the presence of a polymerization catalyst, an anionic surfactant, and at least one cation of the group: triethanolammonium, tri(2-propanol)ammonium, diethanolammonium, and $C_1$-$C_3$ alkyldiethanol ammonium. The grafted copolymers of 2-chloro-1,3-butadienes so produced range from rubbery to plastic materials.

The polymerization reaction of Simons is carried out in the presence of a catalyst, preferably a redox pair such as sodium sulfite/potassium persulfate, cumene hydroperoxide/sodium hydrosulfite, etc. Although Simons discloses that the substituted acrylate content of the product can be from 15 to 80%, this content is limited to 40 to 80% in the graft copolymers in the blends of the present invention.

In the specific examples hereinbelow, usually a small amount of sulfur (up to 1% by weight, based on the monomer) is used in making the graft copolymer. Most of this sulfur combines, resulting in a 2-chloro-1,3-butadiene/alkyl acrylate/sulfur polymer having alkylacrylate grafts. However, such graft copolymers without sulfur or containing as much as 2% by weight of sulfur can be used in this invention.

In the Simons procedure, it is important that the polymerization of the monomers be carried practically to completion (preferably 95–90% or more), because the grafting reaction takes place during the latter part of the polymerization.

Procedures, other than those of Simons, for forming an alkyl methacrylate graft on sulfur-modified chloroprene can also be used for making the graft copolymer component of the bends of the present invention. Roedel U.S. Pat. 2,356,091 describes forming a chloroprene-sulfur polymer in the presence of 0.2 to 2.0% of sulfur and, when the chloroprene monomer is all polymerized, adding a methacrylic monomer as an aqueous emulsion containing 0.1 to 2.0% ammonium persulfate, based on the monomer weight, and polymerizing to the desired extent. (See col. 1, lines 24 to 39. Examples include a 60/40 ethyl methacrylate/polychloroprene polymer and an 80/20 isobutyl methacrylate/polychloroprene copolymer.

Preferably the graft copolymer component of the blends of this invention is made without modifiers such as alkyl xanthogen disulfides, but as much as 0.5 part of isopropyl xanthogen disulfide has been used. (See Example 2 hereinbelow). Usually at least 0.1 part sulfur is added to the graft copolymer, but as Example 3 shows, this is not required.

When the graft copolymer is made by emulsion polymerization techniques it can be isolated by freeze-roll or drum-drying techniques, as described hereinbelow.

The 2-chlorobutadiene-1,3/sulfur copolymer

The chlorobutadiene/sulfur copolymers used as a component of the polymer blends of this invention can be made by known general procedures for making such polymers in alkaline emulsion. These are described, for instance, in vol. 3, p. 711 of Encyclopedia of Polymer Science and Technology, John Wiley & Sons, 1965, and in Collins U.S. Pat. 2,264,173 and Scott U.S. Pat. 3,082,262. There are three limitations, however, as follows: (1) a thiuram disulfide or other thiophilic reagent is not used, since peptization with such agents is carried out at the time of forming dispersions of said polymers, (2) the emulsification system is one that permits blending with the stabilizer graft copolymer, and (3) the conversion of monomer to polymer must not be over about 95%. For short-stopping the polymerization 4-t-butyl catechol and phenothiazine, typically about 0.014 part by weight of each per 100 parts by weight of monomer, can be used. Alternatively, phenothiazine and a cresol or other polymerization inhibitor can be used.

Any of the conventional emulsifying agents can be used in the chloro-butadiene polymerization. These include water-soluble salts, especially sodium, potassium and ammonium salts, of compounds of the following types: Long-chain fatty acids; rosin or rosin derivatives such as wood rosin, tall oil rosin, or disproportionated rosin; higher alcohol sulfates; aryl sulfonic acids such as alkyl benzene sulfonic acids or condensation products with naphthalene sulfonic acids. The only limitation is that the surfactant system be compatible with the surfactant used for the stabilizing graft copolymer of the subsequent blend. Frequently, the emulsifying agents used for the two components of the blend will be the same.

The concentration of monomer present in the starting emulsion is not critical, generally being 30–55 percent by weight. Polymerization can be carried out at a temperature between 0° and 80° C., preferably between 30 and 60° C. Polymerization is initiated and maintained by a free-radical polymerization catalyst such as an organic or inorganic peroxide or hydroperoxide. A chain-transfer agent can be used; conversion of monomer to polymer depends on the amount of chain-transfer agent or sulfur used but in general is 60 to 95%.

The amount of sulfur used is 0.2 to 2.0%, and this is dissolved in the monomer. If less than 0.7% sulfur based on the monomer is added, dialkyl xanthogen disulfide is used as a modifier or the conversion is limited to about 70% in order to keep the member average molecular weight between sulfur atoms below 110,000.

The "number average molecular weight between sulfur atoms" is determined as follows: First, the chlorinated butadiene-sulfur polymer is completely peptized as follows: In 100 ml. of tetrahydrofuran, 0.1 g. of the polymer, 0.1 g. of piperidinium pentamethylene dithiocarbamate, and 0.5 mg. of phenothiazine are allowed to react under nitrogen for 24 hours at 24° C. The inherent viscosity is then run in the tetrahydrofuran at 30° C. From unpublished work it is known that the ratio:

$$\frac{\text{Inherent viscosity in tetrahydrofuran}}{\text{Inherent viscosity in benzene}} = 1.15 \text{ for neoprene}$$

Then, from a relationship of intrinsic viscosity in benzene to viscosity average molecular weight given in Nichols and Mochel (Ind. Eng. Chem. 43, 154 (1951) a value for $M_v$ (viscosity average molecular weight) is obtained. Using a ratio of 2.1 for viscosity average mol. wt./number average mol. wt. one obtains the number average molecular weight. This is given, for instance, in Example 8.

If the latex emulsion obtained from the polymerization is to be isolated by the freeze-roll technique (see Encyclopedia of Polymer Science, loc. cit.) it will be acidified, generally with acetic acid, to a pH of about 5.7, and at least some acid-stable dispersing agent must be present to prevent premature coagulation. Such acid-stable dispersing agents are exemplified by the water-soluble salts of sulfonic acids of long hydrocarbon chains or of polycyclic systems, or water-soluble salts of sulfuric acid esters of long-chain alcohols. Generally the sodium salt of the condensation product of a naphthalene sulfonic acid with formaldehyde is used.

If wood rosin or modified wood rosin is not used as the emulsifying agent, the isolation of the polymerized product will generally be by use of a drum dryer heated with about 50 p.s.i. stream. In this case the pH of the emulsion need not be lowered before isolation.

If the polymerization is taken to less than 90% conversion, it is advisable to remove unreacted monomer by steam stripping, preferably at about 125–150 mm. absolute pressure, using a turbannular stripper.

In this invention, the amount of sulfur in the polymers is defined as the amount of sulfur added to the emulsion before polymerization. This amount is generally added by dissolving in the monomer.

Blending

The blending of the graft copolymer and the 2-chlorobutadiene-sulfur polymer can be carried out by any method adapted to give an intimate mixture of these components. The components can, for instance, be mechanically blended, as on a rubber compounding mill. While this gives an intimate mixture it is difficult to redisperse in fluid media.

In a preferred aspect of the present invention the blending is accomplished by mixing the emulsions of the separate polymers as they are produced in the emulsion polymerization processes. The combined polymer blend is then isolated by freezing on a freeze roll, as described above for the chlorobutadiene-sulfur polymer, followed by washing the film and squeezing it between rollers to about 25–30% moisture and drying at about 120° C. Alternatively, the combined polymer can be isolated by drum drying, preferably at about 50 lbs. steam pressure.

Preparation of dispersions

The blend of polymers prepared as above described can be dispersed in aliphatic liquids by mechanical action such as in a colloid mill. The blend is preferably in pieces ¼" or smaller in greatest dimension, but optionally is used as chips about ¼" thick by 1" to 2" in greatest dimension.

In a further aspect of the present invention, such dispersion is effected with the aid of a thiophilic peptizing agent. The amount of peptizing agent is usually 0.5 to 2.0 parts by weight per 100 parts of chlorobutadiene-sulfur polymer. The organic aliphatic medium in which dispersion is effected is preferably a hydrocarbon such as pentane, hexane, heptane, or octane for C–4 to C–18 alkyl esters of acrylic (or methacrylic) acid grafts and is preferably acetone for methyl methacrylate grafts. Polymers of the C-4 to C-18 alkyl esters of acrylic and methacrylic acids are given as appropriate chain-like components for use as polymeric stabilizers in aliphatic liquids in Nicks et al. U.S. Pat. 3,532,663.

The ingredients of the dispersion are stirred, ballmilled, or mixed with a high speed mixer until a dispersion of the polymers is formed, the time depending on the initial state of subdivision of the polymer, the temperature, the intensity of agitation, and the effectiveness of the thiophilic peptizing agent employed. The time may vary from minutes to several hours.

Especially preferred thiophilic peptizing reagents are a mixture of diethyl ammonium diethyl dithiocarbamate and a tetramethyl or tetraethyl thiuram disulfide, or a thiol such as xylene thiol in combination with triethylamine. Since the active peptizing agent requires a base to form the active $RS^0$, a base soluble in the aliphatic solvent is employed as an "initiator" for the peptization. For example, with a thiol, triethylamine is used. Suitable peptizing agents for this aspect of the invention are aromatic and aliphatic mercaptans, aliphatic and aromatic disulfides, and tetraalkylthiuram disulfides. Specific examples include benzenethiol; xylenethiol; phenyl disulfide; xylyl disulfide; tetramethyl thiuram disulfide; 2,2'-dibenzamido diphenyl disulfide; and salts of dithiocarbamates. The amount of peptizing agent varies with the polymer blend being peptized and the quality of dispersion required.

Dispersions can be made which are resistant to settling for periods up to a month, by use of preferred thiophilic agents, high solids, and close matching of solubility peramater of the organic liquid to the acrylate or methacrylate graft.

Examples

The invention will be better understood by reference to the following illustrative examples, in which parts and percents are by weight unless otherwise stated.

EXAMPLE 1

(a) Graft copolymer containing equal amounts of chloroprene and 2-ethylhexyl methacrylate and made using 0.25% sulfur based on total monomer A solution of 3.75 grams of sulfur, 750 grams of 2-chloro-butadiene-1,3, 750 grams of 2-ethylhexyl methacrylate and 32.25 grams of dodecyl benzene sulfonic acid is added to a solution of 1995 grams of distilled water, 30 grams of triethanol amine and 0.075 gram of sodium chloride in a round bottom, 5 neck, 5 liter flask equipped with a mechanical stirrer, thermometer, gravity leg (dip tube for hydrometer specific gravity measurements) and an external water bath for heating and cooling. The mixture is stirred rapidly under a nitrogen blanket and is warmed to 40° C. over a ten minute period. Four cubic centimeters of cumene hydroperoxide is added all at once and the polymerization reaction is started by the dropwise addition of a catalyst solution of 10.85 grams of sodium sulfite in 150 grams of distilled water. After 1½ hours at 40° C. and a total of 15 ml. of the sodium sulfite solution are added, the specific gravity increases from 0.970 to 1.008 as measured at 40° C. The temperature is raised to 65° C. and the sodium sulfite solution addition continued at a rate of between 10 and 20 ml. per hour. After three additional hours at 65° C. and a total of 60 ml. of sodium sulfite solution are added, the specific gravity reached at 65° C. is 1.023. Five more ml. of the sodium sulfite solution are added but no further reaction takes place during the next 2¼ hours. The reaction mixture is stabilized by the addition of 20.2 grams of an emulsion containing the relative proportions of 32 parts of water, one part of sodium lauryl sulfate, 1.0 part of formaldehydenaphthalene sulfonic acid condensation product, 64 parts of toluene, 1 part of p-tert-butylcatechol and 1 part of phenothiazine. The evaporation of a small sample of the final latex shows it to have 42.7% solids, which corresponds to a conversion of 99.1.%. Analysis of this isolated sample is 19.5% chlorine.

(b) Preparation of chloroprene-sulfur polymer using 1% sulfur based on monomer

A solution of 1500 grams 2-chlorobutadiene-1,3, 0.045 gram of di-t-butylhydroquinone, 32.25 grams of dodecyl benzene sulfonic acid, and 15 grams of sulfur, is added to a solution of 30 grams of triethanol amine, 1995 grams of distilled water and 0.975 gram of sodium chloride in a 5 liter, 5-neck, round-bottom flask equipped with a mechanical stirrer, thermometer, gravity leg and external water bath. The mixture is stirred rapidly under a blanket of nitrogen for 10 minutes during which time a solution containing 15 grams of water and 1.5 grams of sodium sulfite is added. The temperature is adjusted to 40° C. and the reaction is initiated by the dropwise addition of a solution of 100 grams of water, 2.1 grams of potassium persulfate and 0.2 gram of anthraquinone 2-sodium sulfonate. The temperature is maintained at 40° C. for 2 hours and 23 minutes during which time 17 ml. of the above persulfate catalyst solution is added and the specific gravity increases from 0.968 to 1.060 at 40° C. The reaction is stopped by the addition of 20.2 grams of a stabilizing emulsion described in (a). The conversion based on the evaporated solids content of a small sample of latex is 77.5%. The unreacted monomer is removed by steam distillation at 125 mm. absolute pressure before using the latex for blending purposes.

Blend containing 1:3 ratio of 2-ethylhexyl methacrylate to chloroprene. (Graft polymer made using 0.25% S and chloroprene polymer made using 1% S).—A latex blend containing 1000 grams (427 grams of polymer) of the emulsion described in (a) and 1322 grams of the emulsion (427 grams of polymer) described in (b) is isolated by double roll drum dryer heated with 50 p.s.i. steam, the polymer being rolled up as a "cigar like" roll. The isolated polymer contains 25% of the 2-ethylhexylmethacrylate and analysis for chlorine is 28.7%. The polymer (2.5 grams) is put into a bottle containing 10 grams of technical heptane, 0.11 gram of xylenethiol and 0.15 gram of triethylamine. The bottle is put onto a wrist action-type shaker for an hour to give a non-viscous, fine, stable dispersion. The particle size measured by use of a 970X oil immersion (objective) microscope is found to be between 0.5 and 1 micron.

The same procedure is repeated except D-limonene dimercaptan (0.3 gram) is used in place of xylenethiol. A fine dispersion is obtained.

EXAMPLE 2

(a) Preparation of a graft copolymer containing equal parts of chloroprene and 2-ethylhexyl methacrylate modified with 0.5% isopropyl xanthogen disulfide The same procedure as described in Example 1(a) is followed except that 7.5 grams of isopropyl xanthogen disulfide is used in place of the sulfur. The conversion based on the solids content of a small sample of latex evaporated to dryness is 99.1% and its analysis is 19.1% chlorine.

(b) Preparation of chloroprene-sulfur polymer using 0.2% sulfur and 0.39% ethyl xanthogen disulfide based on monomer A solution of 1500 grams of 2-chlorobutadiene-1,3; 45 grams of disproportionated wood rosin; 5.85 grams of ethyl xanthogen disulfide; and 3 grams of sulfur is mixed with a solution of 2000 grams of water, 8.25 grams of sodium hydroxide and 4.5 grams of sodium sulfite in a 5 liter, 5-neck round-bottom flask equipped with a mechanical stirrer, thermometer, gravity leg and external water bath. The mixture is stirred vigorously for 10 minutes while the temperature is raised to 40° C. by heatmg. The reaction is initiated by adding dropwise a solution of 3 grams of potassium persulfate and 0.075 gram of anthraquinone-2 sodium sulfonate in 60 grams of water. The temperature is held at 40° C. for 2⅓ hours during which time 13 ml. of the catalyst solution is added. During this time period the specific gravity rises in a regular fashion from 0.974 to 1.061 at which point the reaction is stopped with 20.2 grams of the emulsion described in Example 1, part (a). The conversion based on the evaporated solids content of a small sample of latex is 78.4%. The excess monomer is removed by steam distillation at about 125 mm. absolute pressure before using it for blending purposes.

Blend containing 1:3 ratio of ethylhexyl methacrylate and chloroprene (Graft polymer made using 0.5% isopropyl xanthogen disulfide and chloroprene polymer made using 0.2% S and 0.39% xanthogen disulfide).—A latex blend composed of equal weights of polymer from the latices of (a) and (b) is isolated by drum drying as in Example 1, part (a). A 50 gram sample of the solid polymer is cut into small pieces (about ¼" dimension) and placed in a 250 cc. round bottom flask equipped with a paddle stirrer and reflux condenser. After the addition of 75 grams of technical heptane, 1.0 gram tetraethylthiuram disulfide, and 0.25 gram of the diethyl ammonium salt of diethyl dithiocarbamic acid, the mixture is stirred vigorously for two hours. The resulting smooth dispersion is filtered through cheese cloth, but no lumps of undispersed polymer still exist. The dispersion has 40.8% solids. At 25° C., viscosity is measured on a Brookfield Model LVT viscometer using No. 1 spindle. Viscosity is dependent on the r.p.m.'s of the spindle as follows:

| R.p.m.: | Cps. |
|---|---|
| 0.3 | 4860 |
| 0.6 | 3450 |
| 1.5 | 2100 |
| 3.0 | 1480 |

EXAMPLE 3

(a) Preparation of graft copolymer 50% 2-ethylhexyl methacrylate and 50% chloroprene, no sulfur The same procedure as described in Example 1, part (a), is followed except that no sulfur is added. The conversion based on the solids content of a small sample of latex is found to be 99.5% and analysis is 19.0% chlorine.

(b) Preparation of chloroprene-sulfur polymer using 1% sulfur based on monomer

The same procedure as described in Example 2, part (b) is used except the amount of sulfur used is 15 grams and no ethyl xanthogen disulfide is used. In this case the conversion is 95% based on solids analysis and steam stripping is omitted.

Blend containing 1:3 ratio of 2-ethylhexyl methacrylate to chloroprene. (Graft polymer made without S, chloroprene polymer made using 1% sulfur).—A latex blend composed of equal weights of polymer from the latices described in (a) and (b) of this example is isolated by drum drying as in Example 1(a). A 50 gram sample is put into a jar containing 75 grams of technical heptane, 1.0 gram of tetraethylthiuram disulfide and 0.25 gram of the diethyl ammonium salt of diethyldithiocarbamic acid. After rolling for 12 hours a smooth dispersion having 41.2 percent solids is obtained. Further mixing with an Eppenbach Homomixer had no apparent effect indicating that a good dispersion had been obtained by the rolling technique.

EXAMPLE 4

(a) Preparation of graft copolymer containing equal amounts 2-ethylhexylacrylate and chloroprene and made using 0.25% sulfur The same procedure as described in Example 1, part (a) is followed except that 750 grams of 2-ethylhexylacrylate is used in place of the 2-ethylhexylmethacrylate. The conversion based on the solids content of a small sample of latex evaporated to dryness is 93.2% and analysis of the polymer for chloride is 20.2%.

(b) Blend containing 1:3 ratio of 2-ethylhexylacrylate to chloroprene. (Graft polymer made using 0.25% S and chloroprene polymer made using 1% S)

A latex blend composed of equal weights of polymer from the latices described in (a) and of the chloroprene-sulfur latex of Example 3, part (b) are isolated by drum drying as in Example 1, part (a). A 50 gram sample is put into a jar containing 75 grams of technical heptane, 1.0 gram of tetraethylthiuram disulfide and 0.25 gram of the diethylammonium salt of diethyldithiocarbamic acid. After rolling 12 hours a very smooth dispersion which needed no further mixing is obtained. The solids content is 40.6%.

EXAMPLE 5

(a) Preparation of a graft copolymer containing methyl methacrylate, chloroprene, and 2-3 dichlorobutadiene and 0.25% sulfur The same procedure described in Example 1, part (a) is used with the exception of the temperature and the monomer mixture. In this example 535 grams of 2-chlorobutadiene-1,3, 215 grams of 2,3-dichlorobutadiene and 750 grams of methylmethacrylate are used in place of the 2-ethylhexylmethacrylate/2-chlorobutadiene - 1,3 mixture and the temperature is kept at 40° C. throughout the polymerization. After a total of seven hours the latex is stabilized with the same emulsion used in Example 1. The conversion based on the solids content of a small sample of latex evaporated to dryness is 98.7% and analysis is 22.2% by weight chlorine.

(b) Preparation of a chloroprene/2,3-dichlorobutadiene/sulfur-polymer using 1% sulfur based on monomer The same materials are charged and the same procedure as described in Example 1, part (b) is used with the exception (1) that a mixture of 1070 grams of 2-chlorobutadiene and 430 grams of 2,3-dichlorodbutadiene is used in place of the 2-chlorobutadiene alone, and (2) that the conversion is carried to 96.8%. Over a reaction time of 7¼ hours the specific gravity changed from 0.995 to 1.096 with the addition of 32 ml. of the catalyst solution described in Example 1, part (a). The latex is stabilized with 22.9 grams of the emulsion described in Example 1, part (a).

Preparation of blends containing 20 to 30% methyl methacrylate and containing chloroprene and 2,3-dichlorobutadiene. (Graft polymer made using 0.25% S and chloroprene-dichlorobutadiene-S polymer made using 1%–S).—Three latex blends are prepared using the latices described in (a) and (b) of this example:

| | Polymer wt. | | Weight percent methyl methacrylate in blend |
|---|---|---|---|
| | (a) | (b) | |
| Blend: | | | |
| 1 | 40 | 60 | 20 |
| 2 | 50 | 50 | 25 |
| 3 | 60 | 40 | 30 |

The three blends, isolated by drum drying as in Example 1(a) are dispersed using the following recipe:

| | Grams |
|---|---|
| Polymer | 2.5 |
| Acetone | 10.0 |
| RPA No. 3 [1] | 0.3 |
| Triethylamine | 0.15 |

[1] Xylenethiol 36.5% active ingredient or 0.11 gram active ingredient.

All three blends give fine, smooth dispersions after 15 hours on a wrist-action shaker.

EXAMPLE 6

A 1:1 blend of a graft copolymer containing equal parts of chloroprene and 2-ethylhexylmethacrylate and of a chloroprene-sulfur copolymer. (Graft polymer made using 0.5% isopropyl xanthogen disulfide and chloroprene-S polymer made using 1%-S)

A latex blend composed of equal weights of polymer from the latices described in Example 2, part (a) and Example 3, part (b) are isolated after acidifying to a pH of 5.7 with 10% acetic acid containing 2% of sodium bis naphthalene sulfonate by coagulation on a freeze roll as described in Example 1 of U.S. 2,187,146. A 50 gram sample of the solid polymer is put into a 250 cc. round bottom flask equipped with a paddle stirrer and reflux condenser. After the addition of 75 grams of technical heptane, 1 gram diethylthiuram disulfide and 0.25 gram of the diethyl ammonium salt of diethyl dithiocarbamic acid the mixture is stirred vigorously for two hours. The resulting dispersion has 42.6% solids and the Brookfield viscosity measured with a No. 2 spindle is as follows:

| R.p.m.: | Cps. |
| --- | --- |
| 0.3 | 22,900 |
| 0.6 | 13,400 |
| 1.5 | 7,080 |
| 3.0 | 4,370 |
| 6.0 | 2,750 |
| 12.0 | 1,790 |

EXAMPLE 7

(a) Graft copolymer containing 4:1 ratio of 2-ethylhexylmethacrylate to chloroprene and made using 0.1% sulfur based on monomer To a five liter stainless steel beaker blanketed with nitrogen is added 250 gm. chloroprene, 1000 gm. 2 ethylhexyl methacrylate, 1.25 gm. of sulfur and 26.8 gm. of dodecyl benzene sulfonic acid. The sulfur is dissolved and to this solution is added a solution of 1662.5 gm. distilled water, 12.5 gm. triethanolamine and 0.813 gm. of sodium chloride. The mixture is then emulsified with an Eppenbach Homomixer for 3 minutes and then is transferred to a 4 neck 3 liter flask blanketed with nitrogen and fitted with stirrer, a dip tube fitted for withdrawing a sample for hydrometer specific gravity measurement, thermometer, and burrette for sulfite addition.

The temperature is raised to 40° C. and 2 ml. of a 10% aqueous sodium sulfite solution is added to start polymerization. Temperature is maintained at 40° C. and the polymerization maintained with 60 ml. of the sodium sulfite solution added during about 4 hours, bringing the specific gravity of 0.973; at this point the temperature is raised to 60° C. and the polymerization continued with addition of 25 ml. additional sodium sulfite solution over 3 hours to a final specific gravity of 1.005. The polymerization is then cooled to room temperature. A solids determination shows 42.2% solids corresponding to 99% conversion.

(b) Preparation of a chloroprene-sulfur polymer using 1% sulfur based on monomer The same procedure as described in (a) is used to prepare an emulsion of 1250 gm. chloroprene containing 12.5 gm. sulfur and 26.8 gm. dodecylbenzene sulfonic acid with a solution of 0.813 gm. sodium chloride and 12.75 gm. trimethanolamine in 1662.5 gm. water. The temperature is raised to 40° C. in the nitrogen blanketed flask and polymerization is initiated and carried to a final specific gravity of 1.060 during 1¾ hours by the gradual addition of 12 ml. of 10% sodium sulfite solution. The polymerization is stopped by the addition of 40 gm. of the stabilizer emulsion used in Example 1(a). Evaporation of a small sample showed 33.4% solids corresponding to a conversion of monomer of 76%. Unreacted monomer is removed by steam distillation at about 125 mm. absolute pressure and the resulting latex has a solids of 32.8%.

Blend containing 3:2 ratio of 2-ethylhexylmethacrylate to chloroprene. (Graft polymer made using 0.1% sulfur and chloroprene polymer made using 1.0% sulfur).—A blend of 178 gm. of the latex from (a) (75 gm. of polymer) and 76 gm. of the latex from (b) (25 gm. of polymer) is isolated on a double roll drum dryer heated with 30 p.s.i. steam. In a 20 ml. vial 1.5 gm. of the isolated polymer and 8.5 gm. of N-heptane containing 0.05 gm. of approximately a 50:50 mixture of diethyl-ammoniumdiethyldithiocarbamate and tetraethylthiuram disulfide. Upon shaking by hand for 1–2 minutes a stable dispersion of the polymer in heptane is formed, which showed no indication of settling.

EXAMPLE 8

(a) Graft copolymer containing equal parts of chloroprene and 2-ethylhexylmethacrylate and made using 0.25% sulfur based on monomer An ethylhexylmethacrylate-chloroprene-sulfur graft copolymer is made following the procedure of Example 1(a) except that 31 ml. of a solution of 0.05 gm. of anthraquinone-2 sodium sulfonate is added during the 5 hours polymerization. After 2⅓ hours at 40° C. final specific gravity is 1.022.

The conversion is 98% as determined by solids of 41.7% obtained on evaporating a small sample and chlorine analyzed 19.5%.

(b) Preparation of chloroprene-sulfur polymer using 0.4% sulfur based on monomer A chloroprene-sulfur latex is prepared as described in Example 1(b) except only 6 gm. of sulfur (0.4 g./100 g. monomer) is used. The polymerization is stopped at a specific gravity of 1.045, which is equivalent to 66% conversion. After stabilizing as in Example 1(a), the unreacted monomer is steam distilled at 125 mm. absolute pressure to give a 28.9% solids latex.

Preparation of a blend containing 1:3 ratio of ethylhexylmethacrylate to chloroprene. Graft polymer made using 0.25% S and chloroprene polymer made using 0.4% sulfur.—A latex blend of 50 gm. (20.9 gm. of polymer) of the emulsion from (a) and 72.2 gm. of the emulsion from (b) (20.9 gm. of polymer) is isolated on a drum dryer heated with 50 p.s.i.g. steam. The polymer (2.5 gm.) is put into a bottle containing 10 gm. of technical heptane, 0.11 gm. of xylenethiol and 0.15 gm. of triethylamine. The bottle is put onto a wrist action shaker overnight to give a non-viscous, fine dispersion.

A chloroprene-sulfur polymer made in the same way as (b) is fully peptized as a latex to give a polymer having an inherent viscosity of 0.63 in benzene, corresponding to a number average molecular weight between sulfide linkages of 110,000.

We claim:

1. A polymer blend composition peptizable in organic liquids to form sprayable dispersions useful as adhesives, said composition comprising (a) a graft copolymer of (1) a chlorinated butadiene selected from chlorprene and 2,3-dichlrobutadiene-1,3- (2) an alkyl acrylate or an unbranched-$\alpha$-$C_1$ to $C_4$ alkyl acrylate as the graft portion, and (3) up to 2% by weight of sulfur, and (b) a copolymer of sulfur and a chlorinated butadiene selected from chloroprene and 2,3-dichlorobutadiene-1,3-, the proportion by weight of alkyl acrylate or unbranched-$\alpha$-$C_1$ to $C_4$ alkyl acrylate graft portion being 40 to 80% in (a) and 15 to 60% in the total composition; and the proportion of sulfur in (b) being 0.2 to 2.0%; the number average molecular weight between sulfur atoms in (b) being not over 110,000; and the alkyl group of the alkyl acrylate or unbranched-$\alpha$-$C_1$ to $C_4$ alkyl acrylate in (a) containing 1 to 8 carbon atoms.

2. A sprayable adhesive composition comprising a dispersion of a polymer blend of claim 1 peptized in an organic liquid, there being present in the dispersion a thiophilic peptizing agent.

3. In a process for producing a sprayable dispersion of a polymer blend of claim 1 in an organic liquid, the steps comprising mixing the blend with an organic liquid which is a non-solvent for component (b) of the blend but is a solvent for the alkyl ester graft copolymer of component (a), mixing with the resultant product a thiophilic peptizing agent, and stirring until the desired dispersion is obtained.

References Cited

UNITED STATES PATENTS

| | | | |
|---|---|---|---|
| 3,468,833 | 9/1969 | Meinke | 260—29.7 |
| 3,082,262 | 4/1963 | Scott | 260—652.5 |
| 3,592,878 | 7/1971 | Kromolicki | 260—876 |
| 3,192,178 | 7/1965 | Basdekis | 260—30.8 |
| 3,640,941 | 2/1972 | Findley | 260—33.6 A |
| 3,676,526 | 7/1972 | Sommerfeld | 260—876 R |

MORRIS LIEBMAN, Primary Examiner

R. ZAITLEN, Assistant Examiner

U.S. Cl. X.R.

260—34.2, 876 R

PO-1050
(5/69)

UNITED STATES PATENT OFFICE
CERTIFICATE OF CORRECTION

Patent No. 3,794,634   Dated February 26, 1974

Inventor(s) Robert William Keown and Jack Leland Nyce

It is certified that error appears in the above-identified patent and that said Letters Patent are hereby corrected as shown below:

1. A polymer blend composition charactized by being readily peptizable in an aliphatic organic liquid selected from the group consisting of pentane, hexane, heptane, octane, and acetone to form sprayable dispersions useful as adhesives, said composition comprising (a) a graft copolymer of (1) a chlorinated butadiene selected from chloroprene and 2,3-dichlorobutadiene-1,3, (2) an alkyl acrylate or an unbranched-alpha-$C_1$ to $C_4$ alkyl acrylate as the graft portion, and (3) up to 2% by weight of sulfur, and (b) a copolymer of sulfur and a chlorinated butadiene selected from chloroprene and 2,3-dichlorobutadiene-1,3, the proportion by weight of alkyl acrylate or unbranched-alpha-$C_1$ to $C_4$ alkyl acrylate graft portion being 40-80% in (a) and 15-60% in the total composition; and the proportion of sulfur in (b) being 0.2-2.0%; the number average molecular weight between sulfur atoms in (b) being not over 110,000; and the alkyl group of the alkyl acrylate or unbranched-alpha-$C_1$ to $C_4$ alkyl acrylate in (a) containing 1-8 carbon atoms.

2. A sprayable adhesive composition comprising a dispersion of a polymer blend characterized by being readily peptizable in an aliphatic organic liquid selected from the group consisting of pentane, hexane, heptane, octane, and acetone to form sprayable dispersions useful as adhesives,

UNITED STATES PATENT OFFICE
CERTIFICATE OF CORRECTION

Patent No. 3,794,634          Dated February 26, 1974

Inventor(s) Robert William Keown and Jack Leland Nyce

It is certified that error appears in the above-identified patent and that said Letters Patent are hereby corrected as shown below:

said polymer blend comprising (a) a graft copolymer of (1) a chlorinated butadiene selected from chloroprene and 2,3-dichlorobutadiene-1,3, (2) an alkyl acrylate or an unbranched-alpha-$C_1$ to $C_4$ alkyl acrylate as the graft portion, and (3) up to 2% by weight of sulfur, and (b) a copolymer of sulfur and a chlorinated butadiene selected from chloroprene and 2,3-dichlorobutadiene-1,3, the proportion by weight of alkyl acrylate or unbranched-alpha-$C_1$ to $C_4$ alkyl graft portion being 40-80% in (a) and 15-60% in the total composition; and the proportion of sulfur in (b) being 0.2-2.0; the number average molecular weight between sulfur atoms in (b) being not over 110,000; and the alkyl group of the alkyl acrylate or unbranched-alpha-$C_1$ to $C_4$ alkyl acrylate in (a) containing 1-8 carbon atoms; said polymer blend being peptized in an organic liquid, there being present in the dispersion a thiophilic peptizing agent.

3. In a process for producing a sprayable dispersion of a polymer blend characterized by being readily peptizable in an aliphatic, organic liquid selected from the group consisting of pentane, hexane, heptane, octane, and acetone to form sprayable dispersions useful as adhesives, said polymer blend comprising (a) a graft copolymer of (1) a chlorinated butadiene selected from chloroprene and 2,3-dichlorobutadiene-1,3 (2) an alkyl acrylate or an unbranched-alpha-$C_1$ to $C_4$ alkyl acrylate as the

PO-1050
(5/69)

UNITED STATES PATENT OFFICE
CERTIFICATE OF CORRECTION

Patent No. 3,794,634      Dated February 26, 1974

Inventor(s) Robert William Keown and Jack Leland Nyce    Page - 3 -

It is certified that error appears in the above-identified patent and that said Letters Patent are hereby corrected as shown below:

graft portion, and (3) up to 2% by weight of sulfur, and (b) a copolymer of sulfur and a chlorinated butadiene selected from chloroprene and 2,3-dichlorobutadiene-1,3, the proportion by weight of alkyl acrylate or unbranched-alpha-$C_1$ to $C_4$ alkyl graft portion being 40-80% in (a) and 15-60% in the total composition; and the proportion of sulfur in (b) being 0.2-2.0; the number average molecular weight between sulfur atoms in (b) being not over 110,000; and the alkyl group of the alkyl acrylate or unbranched-alpha-$C_1$ to $C_4$ alkyl acrylate in (a) containing 1-8 carbon atoms; the steps comprising mixing said polymer blend with an organic liquid which is a nonsolvent for component (b) of the blend but is a solvent for the alkyl ester graft copolymer of component (a), mixing with the resultant product a thiophilic peptizing agent, and stirring until the desired dispersion is obtained.

Signed and sealed this 22nd day of October 1974.

(SEAL)
Attest:

McCOY M. GIBSON JR.          C. MARSHALL DANN
Attesting Officer            Commissioner of Patents